United States Patent [19]
Chen

[11] Patent Number: 5,915,205
[45] Date of Patent: Jun. 22, 1999

[54] INGRESS NOISE CANCELLATION FOR UPSTREAM SIGNALS ON A CABLE TELEVISION SYSTEM USING AN ANTENNA TO DETERMINE LOCAL NOISE

[75] Inventor: Walter Y. Chen, Plano, Tex.

[73] Assignee: Texas Instruments Incorporated, Dallas, Tex.

[21] Appl. No.: 08/782,162

[22] Filed: Jan. 13, 1997

[51] Int. Cl.$^6$ .................................. H04N 7/173
[52] U.S. Cl. .................. 455/5.1; 455/6.2; 348/6; 348/12; 348/10
[58] Field of Search ................ 348/6–13, 192, 348/193; 375/346–351; 381/94.1, 94.7; 455/3.1, 3.3, 4.1, 4.2, 5.1, 6.1, 6.2, 6.3, 501, 507, 511, 290, 63, 67.1, 67.2, 67.4; H04N 7/173, 7/10

[56] References Cited

FOREIGN PATENT DOCUMENTS

0 748 120  12/1996  European Pat. Off. ....... H04N 7/173

*Primary Examiner*—Nathan Flynn
*Attorney, Agent, or Firm*—Warren L. Franz; William B. Kempler; Richard L. Donaldson

[57] ABSTRACT

A cable television system employs noise cancellation in order to reduce radio frequency noise for upstream signals. The noise cancellation can be located at the headend or located at the juncture between the cable distribution system and the subscriber distribution system. The system employing noise cancellation at the headend has an antenna at a central distribution point on the cable system, such as a fiber node. The system employing noise cancellation at the juncture between the cable distribution system and the subscriber distribution system employs a local antenna. The noise received by the antenna is correlated with noise on the line in an adaptive filter for cancelling or reducing the noise on the line.

31 Claims, 3 Drawing Sheets

INGRESS NOISE CANCELLATION FOR UPSTREAM SIGNALS ON A CABLE TELEVISION SYSTEM USING AN ANTENNA TO DETERMINE LOCAL NOISE

BACKGROUND OF THE INVENTION

Modern cable television systems (CATV) transmit television information from a headend downstream to the subscriber and receive data signals upstream from the subscriber to the headend. In a 70 channel system, the downstream signals typically occupy the band from 50–500 MHz. In addition, digital channels may be transmitted from 500–750 MHz. The upstream signals utilize the unoccupied band from approximately 5–50 MHz.

Figure 1:
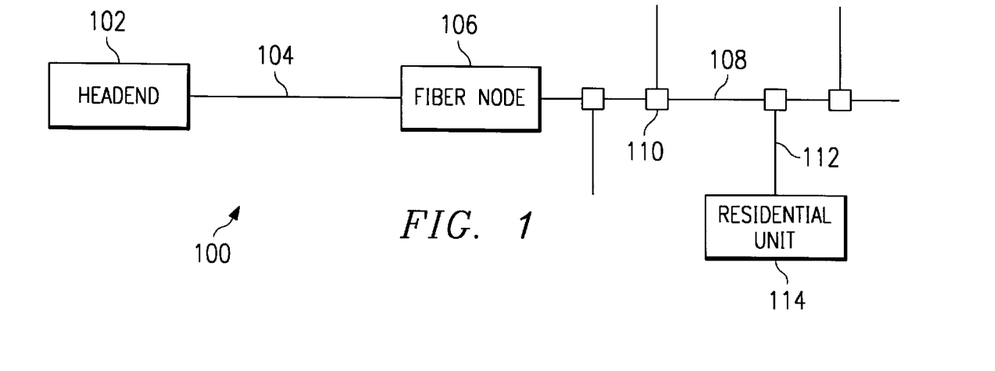
FIG. 1 is a block diagram of a known cable distribution system.

FIG. 1 illustrates a known cable distribution system 100. In the known system, the signal is transmitted from the headend 102 through a fiber optic cable 104 to a fiber node 106. At the fiber node the signal is converted to an electrical signal and distributed over coaxial cable 108 which contains a plurality of taps 110 connecting a plurality of residential units 114 to the distribution cable 108 via a drop cable 112. In older systems, the signal may be transmitted from the headend directly onto the coaxial cable 108. As used herein, the term cable distribution system refers to the distribution cable or fiber optic cable from the headend to the residential unit, sometimes known as the distribution loop plant. In each residential unit, there is a cable distribution system, referred to herein as the subscriber distribution system, which may include a portion installed by the cable company and a portion installed by the subscriber. The portion installed by the subscriber is typically installed by non-skilled persons and often utilizes cable and other components of inferior quality to that provided by the cable television company.

The channel capacity for the upstream signals is lower than can optimally be provided by the 45 MHz bandwidth due to interference signals on the lines. This results in approximately 30 percent reduction in the upstream channel capacity. It is known that these interference signals are off-the-air radio signals. Common radio interference sources are international shortwave stations and local amateur radio operators. International shortwave radio has frequency bands at 6 MHz, 7.5 MHz, 9.5 MHz and 12 MHz, for example. There are usually tens of radio stations active at each frequency band. Amateur radio has a group of similar frequency bands at 7 MHz, 10 MHz and 14 MHz, for example. Amateur radio signals may employ single sideband modulation that makes the transmit power non-stationary.

The field strength of international shortwave radio stations is typically 10–70 dB $\mu$V/m. Short-wave radio interference could come from anywhere on the globe. An individual amateur radio transmitter could generate a field strength of 140 dB $\mu$V/m at a distance of 10 meters. The field strength becomes weaker as the distance increases; being reduced to 100 dB $\mu$V/m at a distance of 1000 meters.

It is believed that the interference on the upstream signal is caused by pickup from the cable distribution system, which is "funneled" into the system. The "funneling" is the result of the widespread cable lines that are all connected to the fiber node and then to the headend. The interference signals picked up by both the drop cables and distribution cables then add on the distribution cable. Thus, the interference at the fiber node will be greater than interference at any other portion in the coaxial cable distribution portion of the cable television system, and thus reduce the channel capacity of the upstream signals. It has also been shown that problems in the installation of the subscriber distribution system, caused both by use of inferior components and by the installation by non-skilled persons, results in this being a significant source of interference signals.

Cable television systems will become increasingly interactive. Assuming that the channel capacity is currently reduced by 30 per cent, a 10 dB reduction in noise should result in a 45 megabit per second (Mbps) increase in the channel capacity, thereby allowing significantly more data to flow in the upstream direction, thus permitting the interactive services provided by the cable system to be expanded.

SUMMARY OF THE INVENTION

It is a general object of the present invention to reduce noise in upstream signals on cable television systems.

It is a further object of the present invention to reduce noise in upstream signals in hybrid fiber optics/coaxial cable television systems.

Another object of the present invention is to reduce radio frequency noise for upstream signals on a cable television system.

Yet another object of the present invention is to increase the channel capacity for upstream signals on cable television systems.

A further object of the present invention is to provide noise cancellation for upstream signals at the headend.

A still further object of the present invention is to provide noise cancellation for upstream signals at the juncture of the cable distribution system and the subscriber distribution system.

These and other objects, advantages and features are achieved by a cable television system having noise interference cancellation apparatus for upstream signals. A cable distribution system distributes television signals downstream from a central distribution point to a plurality of subscribers and transmits data signals upstream from at least one of the subscribers to the central distribution point. A signal controller located at a subscriber transmits the upstream data signals to the central distribution point. An antenna is coupled to an adaptive filter which is also coupled to the cable distribution system between the signal controller and the central distribution point for cancelling radio frequency interference in the upstream signal.

Another aspect of the invention includes a method of noise interference cancellation for upstream signals in a cable television system. A cable distribution system distributes downstream television signals downstream from a central distribution point to a plurality of subscribers and transmits data signals upstream from at least on of the subscribers to the central distribution point. Radio frequency signals which will interfere with the upstream signals are received via an antenna to generate an antenna signal. Radio frequency interference signals are cancelled in an adaptive filter coupled to the cable distribution system.

A further aspect of the invention comprises noise interference apparatus for use in a cable television system having a cable distribution system for distributing television signals downstream from a central distribution point to a plurality of subscribers and for transmitting data signals upstream from at least one of the subscribers to the central distribution point. An antenna receives interference signals and generates an antenna signal. Noise cancelling means receives the antenna signal and the upstream signal for cancelling interference in the upstream signal by correlating the antenna signal and the upstream signal.

A still further aspect of the invention includes noise interference cancellation apparatus for use in a cable television having a cable distribution system for distributing television signals downstream from a central distribution point to a plurality of subscribers, each subscriber having a subscriber distribution system located within the premises of the subscriber and connected to the cable distribution system, and for transmitting data signals from at least one of the subscribers upstream to the central distribution point. An antenna local to each of the subscribers receives radio frequency interference signals in the range of substantially 5–50 MHz which interfere with the upstream signals and generates an antenna signal. An adaptive filter located at a juncture of the cable distribution system and the subscriber distribution system receives the antenna signal and the upstream signals for cancelling the radio frequency interference by correlating the antenna signal and the upstream signal. The adaptive filter comprises a first bandpass filter coupled to the antenna, a first demodulator coupled to the first bandpass filter, a first A/D converter coupled to the first demodulator, a second bandpass filter coupled to the upstream signals, a second demodulator coupled to the second bandpass filter, a second A/D converter coupled to the second demodulator, a correlator coupled to the first and second A/D converters for reducing interference in the upstream signals, a D/A converter coupled to the adaptive filter, and a modulator coupled between the D/A converter and the cable distribution system.

Another aspect of the invention includes noise interference canceling apparatus for use in a cable television having a cable distribution system for distributing television signals downstream from a headend via an optical fiber to a fiber node and from the fiber node via coaxial cable to a plurality of subscribers, each subscriber having a subscriber distribution system located within the premises of the subscriber and connected to the cable distribution system, and for transmitting data signals from at least one of the subscribers upstream to the central distribution point. An antenna located at the fiber node receives radio frequency interference signals in the range of substantially 5–50 MHz which interfere with the upstream signals and generates an antenna signal. An adaptive filter located at the headend receives the antenna signal via the optical fiber and the upstream signals for cancelling the radio frequency interference by correlating the antenna signal and the upstream signal. The adaptive filter comprises a first bandpass filter coupled to the antenna, a first demodulator coupled to the first bandpass filter, a first A/D converter coupled to the first demodulator, a second bandpass filter coupled to the upstream signals, a second demodulator coupled to the second bandpass filter, a second A/D converter coupled to the second demodulator, and a correlator coupled to the first and second demodulators for reducing interference in the upstream signals.

Yet another aspect of the invention includes noise interference cancellation apparatus for use in a cable television having a cable distribution system for distributing television signals downstream from a headend via an optical fiber to a fiber node and from the fiber node via coaxial cable to a plurality of subscribers, each subscriber having a subscriber distribution system located within the premises of the subscriber and connected to the cable distribution system, and for transmitting data signals from at least one of the subscribers upstream to the central distribution point. A first antenna located at the fiber node receives radio frequency interference signals in the range of substantially 5–50 MHz which interfere with the upstream signals and generates an antenna signal. A first adaptive filter located at the headend receives the antenna signal via the optical fiber and the upstream signals for cancelling the radio frequency interference by correlating the antenna signal and the upstream signal. The first adaptive filter comprises a first bandpass filter coupled to antenna, a first demodulator coupled to the first bandpass filter, a first A/D converter coupled to the first demodulator, a second bandpass filter coupled to the upstream signals, a second demodulator coupled to the second bandpass filter, a second A/D converter coupled to the second demodulator, a correlator coupled to the first and second demodulators for reducing interference in the upstream signals; and a second antenna local to each of the subscribers receives radio frequency interference signals in the range of substantially 5–50 MHz which interfere with the upstream signals and generates a second antenna signal. A second adaptive filter located at a juncture of the cable distribution system and the subscriber distribution system receives the antenna signal and the upstream signals for cancelling the radio frequency interference by correlating the antenna signal and the upstream signal. The second adaptive filter comprises a third bandpass filter coupled to the antenna, a third demodulator coupled to the third bandpass filter, a third A/D converter coupled to the third demodulator, a fourth bandpass filter coupled to the upstream signals, a fourth demodulator coupled to the fourth bandpass filter, a fourth A/D converter coupled to the fourth demodulator, a second correlator coupled to the third and fourth A/D converters for reducing interference in the upstream signals, a D/A converter coupled to the second adaptive filter, and a modulator coupled between the D/A converter and the cable distribution system.

DETAILED DESCRIPTION

Figure 2:
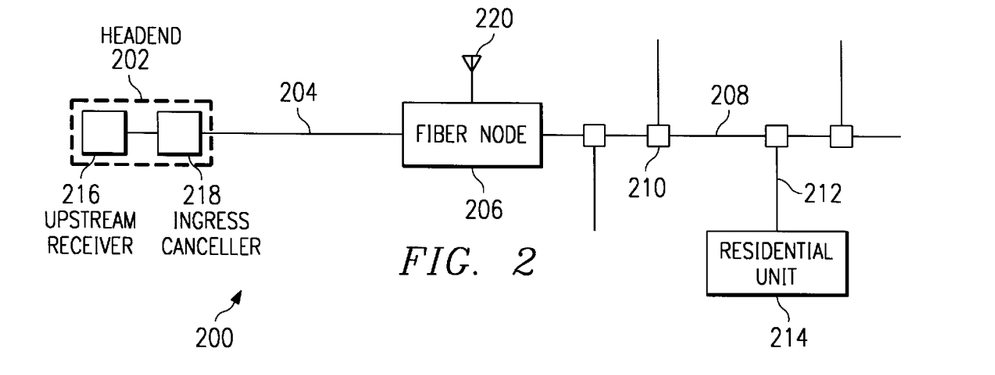
FIG. 2 is a block diagram of a cable distribution system employing the noise cancellation technique of the present invention at the headend.

FIG. 2 illustrates one embodiment of the present invention in which a cable distribution system 200 employs upstream interference signal cancellation. The system 200 is similar to the system 100 shown in FIG. 1 and similar reference numerals illustrate like elements to that shown in FIG. 1. Thus, headend 202 is coupled by fiber optic cable 204 to fiber node 206 from which the signal is converted to an electrical signal which is transmitted on coaxial cable 208. Coaxial cable 208 has a plurality of taps 210 which couple the signal on cable 208 to the drop cable 212 and then to a residential unit 214. Residential unit 214 contains a subscriber distribution system (not shown) which may include components provided by the cable company and components provided by the subscriber.

In the embodiment shown in FIG. 200, an antenna 220 is coupled to fiber node 206. The antenna 220 collects radio frequency signals which may interfere with the upstream data signals along the cable distribution system and couples the signals to fiber node 206. At fiber node 206, the signals are modulated onto the optical fiber cable and transmitted back via the fiber optic cable 204 to headend 202. Headend 202 contains, inter alia, upstream receiver 216 for processing upstream signals and an ingress canceler 218 for cancelling noise on the upstream signals. The other components at the headend 202 for transmitting the signals downstream are well known in the art and omitted from FIG. 2. The ingress canceler 218 separates the upstream signals into those generated by antenna 220 and those generated by the subscribers of the cable system. The two signals are then correlated in an adaptive filter within ingress canceler 218. The adaptive filter can be similar to adaptive filters employed in acoustic echo cancellation.

Adaptive filters are utilized in telephone systems to remove the echo produced by hands-free telephone (speaker phones), for example, where the output of the speaker may be picked up by via microphone of the hands-free telephone and transmitted back to the far end user of the telephone system. Adaptive filters for acoustic echo cancellation are known, for example, from N. D. Degan and C. Prati, "Acoustic noise analysis and speech enhancement techniques for mobile radio applications," Signal Processing, No. 15, pp. 43–56, 1988, North-Holland, which is incorporated herein by reference.

Figure 3:
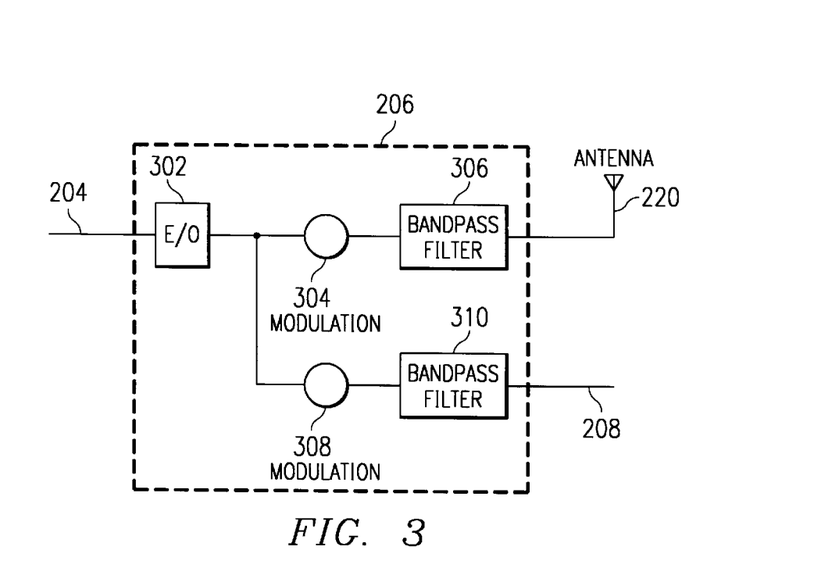
FIG. 3 is a block diagram of the circuitry at the fiber node for the embodiment shown in FIG. 2.

FIG. 3 illustrates the circuitry necessary at the fiber node 206 to transit the upstream and antenna signals to the headend via optical fiber 204. The circuitry necessary at the fiber node for transmitting downstream signals is omitted for clarity. The antenna 220 is coupled to band pass filter 306 which filters out signals that are outside the band of interest for cancelling the noise on the upstream signals. The output of band pass filter 306 is then coupled to modulator 304 which modulates the information on a suitable carrier so that it may be separately transmitted along the fiber optic cable 204 without interfering with the information provided by the upstream signals or interfering with the downstream information. The output of modulator 304 is passed to an electrical/optical interface 302 in which the signal is converted to an optical signal for transmission along the fiber optic cable 304. In systems in which the fiber optic cable 304 is omitted, the modulated signal from modulator 304 could directly be transmitted via a coaxial link to the headend 202. The upstream signals received via coaxial cable 208 are coupled to band pass filter 310 which eliminates signals outside the pass band for upstream signals. The output of band pass filter 310 is passed to modulator 308 which modulates the signal on a suitable carrier for transmission along the fiber optic cable 204 to the headend. The output of modulator 308 is likewise coupled to electrical/optical interface 302 for transmission along the optical fiber 204.

Figure 4:
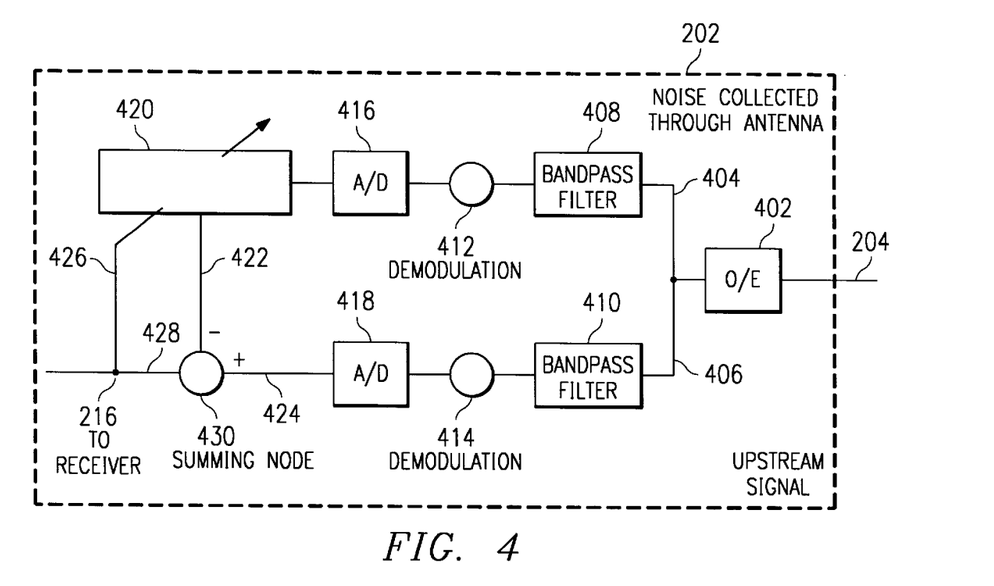
FIGS. 4 is a block diagram of the circuitry at the headend for the embodiment shown in FIG. 2.

FIG. 4 shows the circuitry necessary at the headend for receiving the information from the fiber node 206 and for cancelling the interference signals from the upstream data signals. In the interest of clarity, circuitry necessary to transmit the downstream signals is omitted. Optical fiber cable 204 is received at optical/electrical interface 402 which separates the signal into two electrical signals on lines 404 and 406 because each is received on a separate carrier frequency. The signal representing noise collected through the antenna 220 is coupled via line 404 to band pass filter 408 which removes signals outside the band of interest. The output of band pass filter 408 is passed through demodulator 412 in which the signal is reduced to a base band signal. The output of the demodulator 412 at base band is coupled to the A/D converter 416 in which the noise signals are digitized. The output of the A/D converter is coupled to adaptive filter 420. The upstream data signals on line 406 are coupled to band pass filter 410 which removes signals outside of the band allocated for upstream data signals. The output of band pass filter 410 is coupled to demodulator 414 which the upstream data signals are reduced to a base band signal. The output of demodulator 414 is passed to A/D converter 418 in which the demodulated upstream signals are converted to digital signals. The output of A/D converter 418 is coupled to the plus input of summing node 430 via line 424. The output of adaptive filter 420 is coupled via line 422 to the minus input of summing node 430. The output of the summing node 430 on line 428 is fed via line 426 back to adaptive filter 420 in order to adjust the coefficients of the filter 420, as is well known in the art. Line 428 also couples the output of summing node 430 to the upstream receiver 216 at the headend, as shown in FIG. 2.

Figure 5:
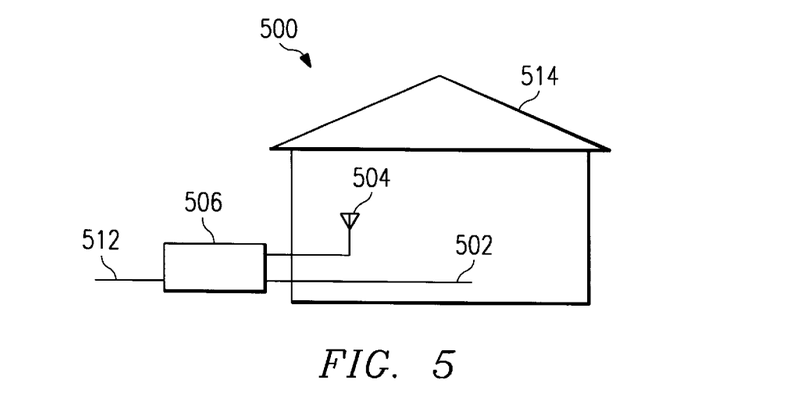
FIG. 5 is a block diagram of an alternate embodiment of the present invention employing noise cancellation at the juncture between the cable distribution system and the subscriber distribution system.

FIG. 5 illustrates a second embodiment of the present invention generally as 500. In this embodiment use is made of the belief that a major source of the interference in the upstream signals is caused by the subscriber distribution system. This second embodiment can be used with the embodiment illustrated in FIG. 2 in order to achieve an even greater cancellation of the noise both from sources within the residence and from sources which may be picked up by the coaxial cable between the residence and the fiber node or headend. In the system of FIG. 5, a residential unit 514 has a subscriber distribution system 502 coupled to a noise canceler 506 the output of which is coupled to drop cable 512. Cable 512 corresponds to cable 212 shown in FIG. 2. Antenna 504, shown located within the residence, is coupled to a second input of noise canceler 506. Although the antenna 504 is shown within the residence, the antenna could be outside of the residence in close proximity to the residence in order to pick up signals which are picked up by the subscriber distribution system within the residence. The interference canceler 506 operates on the upstream signals using an adaptive filter to cancel the interference caused by the radio frequency signals. The close proximity of antenna 504 to the residence will result in the signals that are received by the antenna correlating better with interference signal picked up by the subscriber distribution system.

Figure 6:
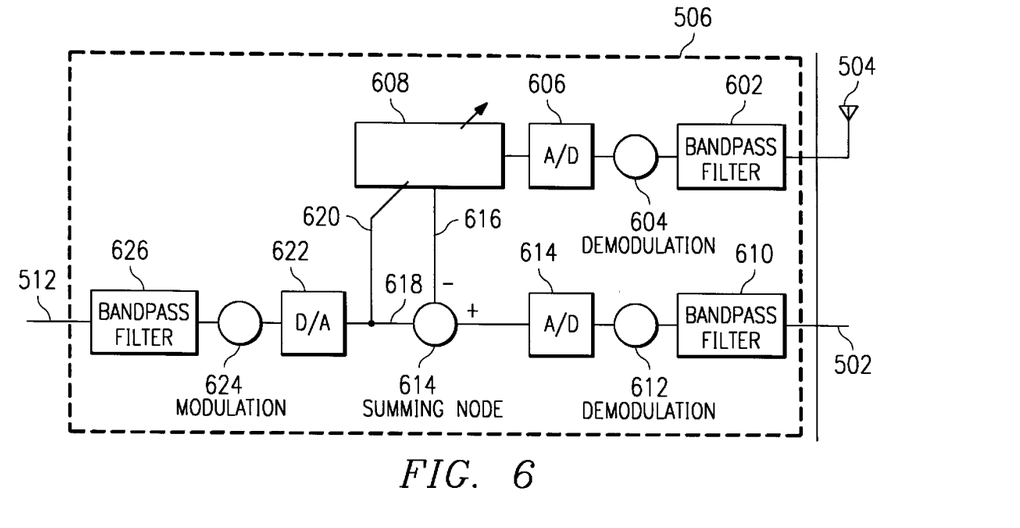
FIG. 6 is a block diagram of the circuitry for noise cancellation technique shown in FIG. 5.

FIG. 6 illustrates the circuitry within the interference canceler 506 necessary to cancel radio frequency interference from the upstream signals. Circuitry necessary to pass the downstream signal from the drop cable 512 to the subscriber distribution system 502 is omitted for clarity. The radio frequency signals received by antenna 504 are coupled to band pass filter 602 in which signals outside the band for signals interfering with the upstream signals are eliminated. The output of band pass filter 602 is passed to demodulator 604 in which the interfering signals are converted to base band signals. The output of demodulator 604 is coupled to A/D converter 606 in which the base band signals are digitized. The output of A/D converter 606 is coupled to adaptive filter 608. The output of the subscriber distribution system 502 is coupled to band pass filter 610 in which signals outside the band for upstream signals are eliminated. The output of band pass filter 610 is coupled to demodulator 612 in which the upstream data signals are converted to base band signals. The base band signals on the output demodulator 612 are coupled to A/D converter 614 in which the data signals are digitized. The output of A/D converter 614 is fed to the plus input of summing node 614. The output of adaptive filter 608 is fed via line 616 to the minus input of summing node 614. The output of summing node 614 is fed via line 618 to line 620 in which the output is fed back to the adaptive filter 608 in order to adjust the coefficients of the adaptive filter in a manner known in the art. Line 618 also couples the output signal to D/A converter 622 in which the output of the summing node 614 is converted to an analog signal again. The analog signal is coupled to modulator 624 in which the signals are remodulated for transmission to the headend. The output of modulator 624 is coupled to band pass filter 626 in which signals outside the band allocated for upstream signals are eliminated. The output of band pass filter 626 is coupled to drop cable 512 for transmission to the cable distribution system.

As stated in the background portion of this application, a 10 dB reduction in noise will result in an increase in the data handling capacity of the channel of 45 Mbps. The following is a sample calculation of the amount of reduction in interference that can be achieved utilizing the present invention. Let us assume that $P_{li}=k_i P_{ai}$ where $P_{li}$ is the power at the ith instance from the cable distribution system, $P_{ai}$ is the power from the antenna at the same instance, and $k_i$ is the random coefficient relating ingress power at the same instance, the correlation coefficient between ingress power from the cable distribution system and the antenna can be calculated as shown in the N. D. Degan and C. Prati article as:

$$R_{P_l' P_a} = \frac{E[P_a P_l]}{\sqrt{E[P_a P_a] E[P_l P_l]}} = \frac{\sum_{i=l}^{n} k_i P_{ai}^2}{\sqrt{\sum_{i=l}^{n} P_{ai}^2 \sum_{i=l}^{n} K_i^2 P_{ai}^2}}$$

For the special case of constant power at the antenna we have $$R_{P_l' P_a} = \frac{\sum_{i=l}^{n} k_i}{\sqrt{n \sum_{i=l}^{n} K_i^2}}$$

TABLE 1

Ingress Power Relationship

| Relationship | Number of Occurrences |
|---|---|
| $P_{li} = 0.00281 P_{ai}$ | 2 |
| $P_{li} = 0.011 P_{ai}$ | 3 |
| $P_{li} = 0.022 P_{ai}$ | 21 |
| $P_{li} = 0.044 P_{ai}$ | 85 |
| $P_{li} = 0.0891 P_{ai}$ | 41 |
| $P_{li} = 0.1778 P_{ai}$ | 16 |
| $P_{li} = 0.3548 P_{ai}$ | 4 |
| $P_{li} = 0.708 P_{ai}$ | 1 |

Using the data of Table 1, we have $$\sum_{i=1}^{n} k_1 = 2 \times 0.0028 + 3 \times 0.011 + 21 \times 0.022 +$$
$$85 \times 0.044 + 41 \times 0.089 + 16 \times 0.1778 + \ldots = 12.8657$$

$$\sum_{i=1}^{n} k^{21} = 2 \times 0.0028^2 + 3 \times 0.011^2 +$$
$$21 \times 0.022^2 + 85 \times 0.044^2 + 41 \times 0.089^2 + \ldots = 2.0112$$

Hence we have $$R_{P_l' P_a} = \frac{12.8657}{\sqrt{173 \times 2.0112}} = \frac{12.866}{18.653} = 0.689$$

Assuming Gaussian properties for ingress from the antenna and from the cable distribution system, the correlation coefficient of ingress is related to the correlation coefficient of ingress power as $$R_{i,a} = \sqrt{(3 R_{P_l' P_a} - 1)/2} = 0.7304$$

which is derived by letting the instantaneous ingress power from the antenna be $P_a = x_a^2$ and the instantaneous power from the cable distribution system be $P_l = x_l^2$, we have the correlation coefficient of ingress as $$R_{i,a} = \frac{E[x_i x_a]}{\sqrt{E[x_i^2] E[x_a^2]}}$$

and the correlation coefficient of ingress power as $$R_{P_i P_a} = \frac{E[P_i P_a]}{\sqrt{E[P_i^2] E[P_a^2]}}$$

We also have the following relationships from K. S. Shamugan and A. M. Breipohl, *Random Signals*, John Wiley and Sons, 1988, which are incorporated herein by reference:

$$E[x_1^2 x_2^2] = E[x_1^2] E x_2^2 + 2((E(x_1 x_2]))^2$$

$$E[x_1^4] = (E[x_1^2])^2 + 2(E[X_1^2])^2 = 3(E[X_1^2])2$$

With these relationships, we can further express $R_{P_l P_a}$ as $$R_{P_i P_a} =$$
$$\frac{E[x_i^2 x_a^2]}{\sqrt{E[x_i^4] E[x_a^4]}} = \frac{E[x_i^2] E[x_a^2] + 2(E[x_i x_a])^2}{\sqrt{3(E[x_i^2])^2 3(E[x_a^2])^2}} = \frac{E[x_i^2] E[x_a^2] + 2(E[x_i x_a])^2}{3 E[x_i^2] E[x_a^2]} =$$
$$\frac{1}{3}\left(1 + 2\left(\frac{E[x_i x_a]}{\sqrt{E[x_i^2] E[x_a^2]}}\right)^2\right) = \frac{1}{3}(1 + 2 R_{i,a}^2)$$

This leads to $R_{i,a} = \sqrt{(3 R_{P_l' P_a} - 1)/2}$

If all the correlated ingress components can be removed the ingress cancellation can reduce the noise level by $20 \times \log_{10}(1 - 0.7304) = 11.3$ dB. The cancellation level could be higher if the antenna is moved closer to the cable distribution system instead of being placed at the headend. On the other hand the relative shielding effectiveness spread could be smaller if all $P_{ai}$'s are really equal.

Performance of the ingress cancellation may be limited by the amount of non-correlated noise existing at either the antenna site or in the cable distribution system. The performance might also be affected if the upstream signal is somehow leaked into the antenna. Assuming that the transmission paths for the ingress through the antenna is $H_1(z)$ and through the cable distribution system is $H_2(z)$, the optimal Wiener solution for the adaptive filter known from B. Widrow, J. R. Glover, Jr., J. M. McCool, J. Kaunitz, C. S. Williams, R. H. Hearn, J. R. Zeidler, E. Dong, Jr., and R. C. Doodlin, "Adaptive noise cancelling: principles and applications," Proc. IEEE, vol. 63, No. 12, pp. 1692–1716, December 1975, which is incorporated herein by reference, is $$W(z) = \frac{S_{nn}(z)H(z^{-1})}{S_{mm}(z) + S_{nn}(z)|H(z)|^2}$$

where $H(z)=H_1(z)/H_2(z)$, $S_{nn}(z)$ is the power spectrum of the ingress, $S_{mm}(z)$ is the power spectrum of the antenna site additive noise. For small $S_{mm}(z)$ we have $W(z) \approx 1/H(z)$. If the antenna somehow also collects the upstream signal, the Wiener solution of the adaptive filter becomes $$W(z) = \frac{S_{ss}(z)F(z^{-1}) + S_{nn}(z)H(z^{-1})}{S_{ss}(z)|F(z)|^2 + S_{nn}(z)|H(z)|^2}$$

where $S_{ss}(z)$ is the power spectrum of the upstream signal and $F(z)$ is the transmission path to the antenna.

Figure 7:
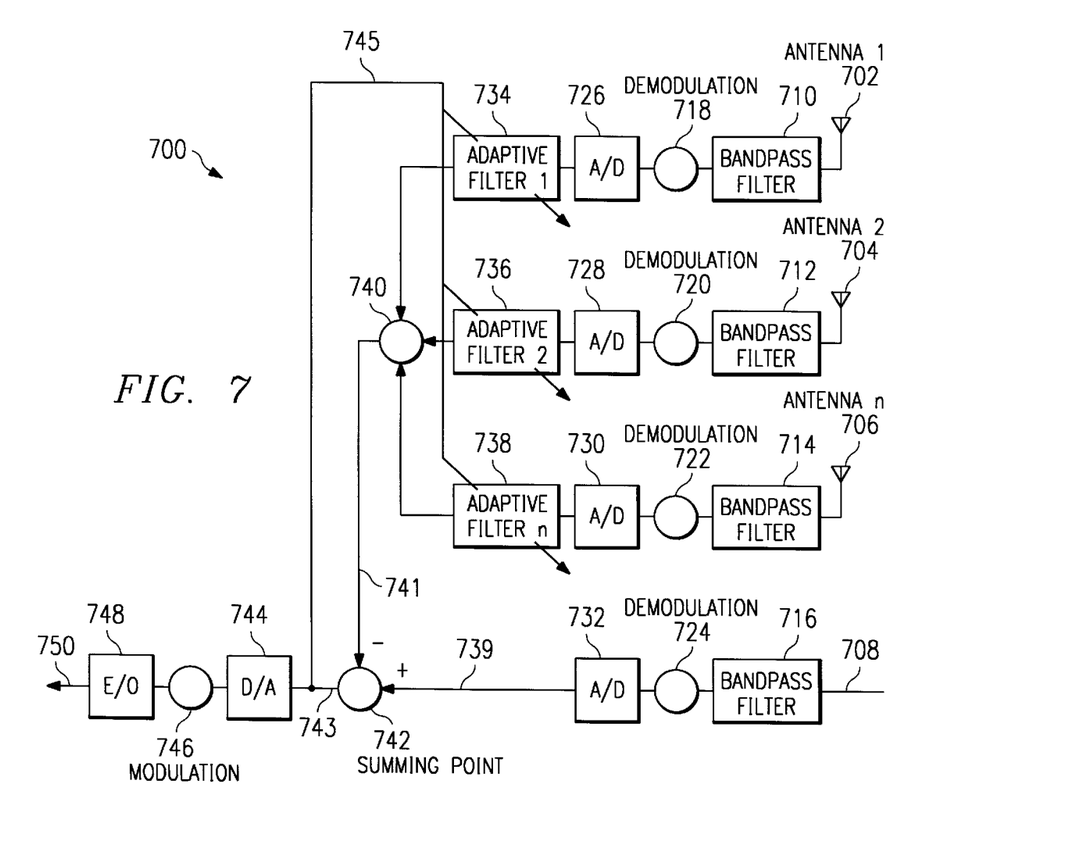
FIG. 7 is an alternate embodiment of the circuitry shown in FIGS. 4 and 6 employing multiple antennas for cancelling multiple frequency signals.

Other factors include the magnitude and the variation rate of the transmission path difference between the antenna and the loop plant. The delay should be short enough to be covered by an adaptive filter with a reasonable number of filter coefficients operating at the sampling which is about twice of the bandwidth of the transmission system. The delay variation should be slow enough to be tracked by the adaptive mechanism.

Where competing ingress sources poses a problem for the single adaptive filter approach, multiple-reference noise cancellation can be applied to obtain a better results. As shown in FIG. 7 n adaptive filters with corresponding antenna sites are used for m(<n) interference sources. The system could be implemented at the fiber node if the transmission of ingress noise collected from many antenna sites through the fiber link is a problem. This technique could also be applied at the residential unit canceler shown in FIG. 5. The antenna sites should be diversified enough such that associated ingress strength distributions are distinguishable.

The matrix Weiner solution for the adaptive filter bank known from the B. Widrow et. al article is $$[W(z)] = [S_{xx}(z)]^{-1} \{S_{xd}(z)\} = [[F(z^{-1})] [S_{\psi\psi}(z)] [F(z)]^T]^{-1} [[F(z^{-1})] [S_{\psi\psi}(z)] \{G(z)\}]$$

where $[S_{xx}(z)]$ is the ingress spectral matrix, $F(z)$ is the ingress to antenna transfer function matrix, and $\{G(z)\}$ is the ingress to the cable distribution system transfer function vector.

By the radio frequency allocation rule, different radio stations should have different carrier frequency hence the interference between different stations could be avoided. However, the carrier frequency overlapping could occur in the boundary between adjacent coverage arena. This could especially happen for short wave radio band because signals have traveled around the globe. The most likely competing situation is expected to involve no more than two ingress sources. Therefore a maximum number of three adaptive filters and associated antenna sites will be sufficient.

FIG. 7 illustrates a system employing multiple antennas and multiple adaptive filters. The first antenna 702 is coupled through a band pass filter 710 which eliminates frequencies outside the desired band. The output of band pass filter 710 is coupled to demodulator 718 in which the signal converted to the base band frequencies. The base band frequencies from the output of the demodulator coupled through A/D converter 726 in which they are digitized. Digital signals are then input to the first adaptive filter 734. Similarly, antenna 704 is coupled to band pass filter 712 and demodulator 720, the output of which is digitized in A/D converter 728 and that is an input to the second adaptive filter 736. The nth antenna 706 is coupled to band pass filter 714 the output of which is demodulated in demodulator 722 and digitized in A/D converter 730, the output of which is fed as an input to the nth adaptive filter 738. The outputs of the adaptive filters are fed to summing point 740. The upstream signals are coupled via line 708 to band pass filter 716 in which frequencies outside the band for the upstream signals are eliminated. The output of band pass filter 716 is coupled through demodulator 724 which converts the signals to base band signals. Base band signals from demodulator 724 are coupled to A/D converter 732 in which they are digitized. The digital signals output from A/D converter 732 are coupled via line 739 to the plus input of summing point 742. The output of summing point 740 is coupled via line 741 to the minus input of summing point 742. The output of summing point 742 is coupled via line 743 to D/A converter 744. The output is also coupled via line 745 to the adaptive filters for adjusting the coefficients thereof in a known manner. The output of D/A converter 744 is fed to modulator 746 in which the signals are remodulated for transmission to the headend. The output of modulator 746 is coupled to electrical/optical interface 748 in which the signals are converted to an optical signal which is then coupled to an optical fiber 750. If the upstream signals are to be placed on a coaxial cable, such as in the example shown in FIG. 5, then the electrical/optical interface 748 is eliminated and the signal is placed directly on to a coaxial cable 750.

While a particular embodiment of the present invention has been disclosed herein, certain changes and modifications will readily occur to those skilled in the art. All such changes and modifications can be made without departing from the invention as defined by the appended claims.

What is claimed is:

1. A cable television system having noise interference cancellation apparatus for upstream signals comprising:

a cable distribution system for distributing television signals downstream from a central distribution point to a plurality of subscribers and for transmitting data signals upstream from at least one of said subscribers to said central distribution point;

a signal controller located at a subscriber for transmitting said upstream data signals to said central distribution point;

an antenna;

an adaptive filter coupled to said cable distribution system between said signal controller and said central distribution point and coupled to said antenna for cancelling radio frequency interference in said upstream signal; said adaptive filter comprising:

a first bandpass filter coupled to said antenna;

a first demodulator coupled to said first bandpass filter;

a first A/D converter coupled to said first demodulator;

a second bandpass filter coupled to said subscriber line;

a second demodulator coupled to said second bandpass filter;

a second A/D converter coupled to said second demodulator; and a correlator coupled to said first and second A/D converters for reducing interference in said subscriber line.

2. The apparatus of claim 1 further comprising a subscriber distribution system located within the premises of the subscriber and connected to said cable distribution system, wherein said adaptive filter is located at a juncture of said cable distribution system and said subscriber distribution system.

3. The apparatus of claim 2 wherein said antenna is local to said subscriber.

4. The apparatus of claim 1 further comprising a D/A converter coupled between said adaptive filter and said cable distribution system.

5. The apparatus of claim 4 further comprising a modulator coupled between said D/A converter and said cable distribution system.

6. The apparatus of claim 1 wherein said central distribution point is an optical fiber node.

7. The apparatus of claim 1 further comprising a headend for transmitting television signals to said central distribution point, wherein said central distribution point is an optical fiber node connected to said headend by an optical fiber, said adaptive filter being located at said headend, said antenna being located at said fiber node and transmitting antenna signals to said adaptive filter via said optical fiber.

8. The apparatus of claim 1 wherein said adaptive filter is a FIR filter.

9. A method of noise interference cancellation for upstream signals in a cable television system comprising a cable distribution system for distributing downstream television signals downstream from a central distribution point to a plurality of subscribers and for transmitting data signals upstream from at least on of said subscribers to said central distribution point, the method comprising:
receiving radio frequency signals which will interfere with said upstream signals via an antenna to generate an antenna signal;
cancelling said radio frequency interference signals in an adaptive filter coupled to said cable distribution system; wherein said cancelling step comprises:
bandpass filtering said antenna signal to generate a filtered antenna signal;
demodulating said filtered antenna signal to generate a first demodulated signal;
converting said first demodulated signal to a first digital signal;
bandpass filtering said upstream signals to generate a filtered upstream signal;
demodulating said filtered upstream signal to generate a second demodulated signal;
converting said second demodulated signal to a second digital signal;
correlating said first and second digital signals for reducing interference in said upstream signals.

10. The method of claim 9 wherein said cable television system further comprises a subscriber distribution system located within the premises of the subscriber and being connected to said cable distribution system, the method further comprising the step of locating said adaptive filter at a juncture of said cable distribution system and said subscriber distribution system.

11. The method of claim 10 further comprising the step of locating said antenna local to said subscriber.

12. The method of claim 9 further comprising the step of D/A converting said correlated signal for generating a third digital signal.

13. The method of claim 12 further comprising modulating said third digital signal.

14. The method of claim 9 further comprising the step of locating said central distribution point at an optical fiber node.

15. The method of claim 9 wherein cancelling step comprises cancelling said radio frequency interference signals in a FIR filter.

16. The method of claim 9 wherein said cable television system further comprises a headend for transmitting television signals to said central distribution point and said central distribution point is an optical fiber node connected to said headend by an optical fiber, the method further comprising the steps of:
locating said adaptive filter at said headend;
locating said antenna at said fiber node;
transmitting said antenna signals from said antenna to said adaptive filter via said optical fiber.

17. The method of claim 16 further comprising the step of D/A converting said correlated signal.

18. In a cable television system having a cable distribution system for distributing television signals downstream from a central distribution point to a plurality of subscribers and for transmitting data signals upstream from at least one of said subscribers to said central distribution point, noise interference cancellation apparatus comprising:
an antenna for receiving interference signals and for generating an antenna signal;
noise cancelling means for receiving said antenna signal and said upstream signal for cancelling interference in said upstream signal by correlating said antenna signal and said upstream signal; said noise cancelling means comprising an adaptive filter including:
a first bandpass filter coupled to said antenna;
a first demodulator coupled to said first bandpass filter;
a first A/D converter coupled to said first demodulator;
a second bandpass filter coupled to said upstream signals;
a second demodulator coupled to said second bandpass filter;
a second A/D converter coupled to said second demodulator; and
a correlator coupled to said first and second A/D converters for reducing interference in said upstream signals.

19. The apparatus of claim 18 wherein said antenna is local to said noise cancelling means.

20. The apparatus of claim 18 wherein said interference is radio frequency signals.

21. The apparatus of claim 20 wherein said radio frequency signals are in the range of substantially 5–50 MHz.

22. The apparatus of claim 18 further comprising a subscriber distribution system located within the premises of the subscriber and connected to said cable distribution system, wherein said adaptive filter is located at a juncture of said cable distribution system and said subscriber distribution system.

23. The apparatus of claim 18 further comprising a D/A converter coupled between said adaptive filter and said cable distribution system.

24. The apparatus of claim 23 further comprising a modulator coupled between said D/A converter and said cable distribution system.

25. The apparatus of claim 18 wherein said central distribution point is an optical fiber node.

26. The apparatus of claim 18 wherein said adaptive filter is a FIR filter.

27. The apparatus of claim 18 further comprising a headend for transmitting television signals to said central distribution point, wherein said central distribution point is an optical fiber node connected to said headend by an optical fiber, said adaptive filter being located at said headend, said antenna being located at said fiber node and transmitting antenna signals to said adaptive filter via said optical fiber.

28. The apparatus of claim 27 wherein said adaptive filter is a FIR filter.

29. In a cable television having a cable distribution system for distributing television signals downstream from a central distribution point to a plurality of subscribers, each said subscriber having a subscriber distribution system located within the premises of the subscriber and connected to said cable distribution system, and for transmitting data signals from at least one of said subscribers upstream to said central distribution point, noise interference cancellation apparatus comprising:
- an antenna local to each of said subscribers for receiving radio frequency interference signals in the range of substantially 5–50 MHz which interfere with said upstream signals and for generating an antenna signal;
- an adaptive filter located at a juncture of said cable distribution system and said subscriber distribution system for receiving said antenna signal and said upstream signal for cancelling said radio frequency interference by correlating said antenna signal and said upstream signal, said adaptive filter comprising:
  - a first bandpass filter coupled to said antenna;
  - a first demodulator coupled to said first bandpass filter;
  - a first A/D converter coupled to said first demodulator;
  - a second bandpass filter coupled to said upstream signals;
  - a second demodulator coupled to said second bandpass filter;
  - a second A/D converter coupled to said second demodulator;
  - a correlator coupled to said first and second A/D converters for reducing interference in said upstream signals;
  - a D/A converter coupled to said adaptive filter; and
  - a modulator coupled between said D/A converter and said cable distribution system.

30. In a cable television having a cable distribution system for distributing television signals downstream from a headend via an optical fiber to a fiber node and from said fiber node via coaxial cable to a plurality of subscribers, each said subscriber having a subscriber distribution system located within the premises of the subscriber and connected to said cable distribution system, and for transmitting data signals from at least one of said subscribers upstream to said central distribution point, noise interference cancellation apparatus comprising:
- an antenna located at said fiber node for receiving radio frequency interference signals in the range of substantially 5–50 MHz which interfere with said upstream signals and for generating an antenna signal;
- an adaptive filter located at said headend for receiving said antenna signal via said optical fiber and said upstream signals for cancelling said radio frequency interference by correlating said antenna signal and said upstream signal, said adaptive filter comprising:
  - a first bandpass filter coupled to said antenna;
  - a first demodulator coupled to said first bandpass filter;
  - a first A/D converter coupled to said first demodulator;
  - a second bandpass filter coupled to said upstream signals;
  - a second demodulator coupled to said second bandpass filter;
  - a second A/D converter coupled to said second demodulator;
  - a correlator coupled to said first and second demodulators for reducing interference in said upstream signals.

31. In a cable television having a cable distribution system for distributing television signals downstream from a headend via an optical fiber to a fiber node and from said fiber node via coaxial cable to a plurality of subscribers, each said subscriber having a subscriber distribution system located within the premises of the subscriber and connected to said cable distribution system, and for transmitting data signals from at least one of said subscribers upstream to said central distribution point, noise interference cancellation apparatus comprising:
- a first antenna located at said fiber node for receiving radio frequency interference signals in the range of substantially 5–50 MHz which interfere with said upstream signals and for generating a first antenna signal;
- a first adaptive filter located at said headend for receiving said antenna signal via said optical fiber and said upstream signals for cancelling said radio frequency interference by correlating said antenna signal and said upstream signal, said first adaptive filter comprising:
  - a first bandpass filter coupled to said antenna;
  - a first demodulator coupled to said first bandpass filter;
  - a first A/D converter coupled to said first demodulator;
  - a second bandpass filter coupled to said upstream signals;
  - a second demodulator coupled to said second bandpass filter;
  - a second A/D converter coupled to said second demodulator;
  - a first correlator coupled to said first and second demodulators for reducing interference in said upstream signals; and
- a second antenna local to each of said subscribers for receiving radio frequency interference signals in the range of substantially 5–50 MHz which interfere with said upstream signals and for generating an antenna signal;
- a second adaptive filter located at a juncture of said cable distribution system and said subscriber distribution system for receiving said antenna signal and said upstream signal for cancelling said radio frequency interference by correlating said antenna signal and said upstream signal, said second adaptive filter comprising:
  - a third bandpass filter coupled to said antenna;
  - a third demodulator coupled to said third bandpass filter;
  - a third A/D converter coupled to said third demodulator;
  - a fourth bandpass filter coupled to said upstream signals;
  - a fourth demodulator coupled to said fourth bandpass filter;
  - a fourth A/D converter coupled to said fourth demodulator;
  - a second correlator coupled to said third and fourth A/D converters for reducing interference in said upstream signals;
  - a D/A converter coupled to said second adaptive filter; and
  - a modulator coupled between said D/A converter and said cable distribution system.

* * * * *

UNITED STATES PATENT AND TRADEMARK OFFICE
CERTIFICATE OF CORRECTION

PATENT NO. : 5,915,205
DATED : June 22, 1999
INVENTOR(S) : Chen

It is certified that error appears in the above-identified patent and that said Letters Patent is hereby corrected as shown below:

Title page, insert the following item:
-- [60] Provisional application No. 60/010,356, Jan. 19, 1996. --

Column 1, line 4, insert the following:
-- CROSS REFERENCE TO RELATED APPLICATION
Reference is made to and priority claimed from U.S. Provisional Application Serial No. 60/010,356, filed Jan. 19, 1996, entitled Ingress Noise Cancellation For Upstream Signals On A Cable Television System. --

Signed and Sealed this

Sixteenth Day of November, 1999

Attest:

Q. TODD DICKINSON

*Attesting Officer*            *Acting Commissioner of Patents and Trademarks*